United States Patent
Bosshart

(10) Patent No.: US 10,785,151 B2
(45) Date of Patent: Sep. 22, 2020

(54) PACKET PROCESSING MATCH AND ACTION PIPELINE STRUCTURE WITH DEPENDENCY CALCULATION REMOVING FALSE DEPENDENCIES

(71) Applicant: TEXAS INSTRUMENTS INCORPORATED, Dallas, TX (US)

(72) Inventor: Patrick W. Bosshart, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/906,944

(22) Filed: Feb. 27, 2018

(65) Prior Publication Data

US 2018/0191613 A1    Jul. 5, 2018

Related U.S. Application Data

(63) Continuation of application No. 14/168,202, filed on Jan. 30, 2014, now Pat. No. 9,906,445.

(60) Provisional application No. 61/919,362, filed on Dec. 20, 2013, provisional application No. 61/759,692, filed on Feb. 1, 2013.

(51) Int. Cl.
*H04L 12/741* (2013.01)
*H04L 12/707* (2013.01)
*H04L 12/771* (2013.01)

(52) U.S. Cl.
CPC .............. *H04L 45/74* (2013.01); *H04L 45/24* (2013.01); *H04L 45/56* (2013.01)

(58) Field of Classification Search
CPC ......... H04L 45/74; H04L 69/22; H04L 45/56; H04L 45/24

USPC ......................... 370/392, 255, 235
See application file for complete search history.

(56) References Cited

U.S. PATENT DOCUMENTS

| | | | |
|---|---|---|---|
| 8,718,064 B2 | 5/2014 | Beliveau et al. | |
| 8,755,389 B1 | 6/2014 | Poutievski et al. | |
| 9,042,234 B1 | 5/2015 | Liljenstolpe et al. | |
| 2007/0002769 A1* | 1/2007 | Matityahu | H04L 41/22 370/255 |
| 2012/0002558 A1* | 1/2012 | Swartzentruber | H04J 3/0661 370/252 |
| 2012/0246400 A1* | 9/2012 | Bhadra | H04L 49/3009 711/104 |
| 2013/0028142 A1* | 1/2013 | Beheshti-Zavareh | H04L 45/22 370/255 |
| 2013/0163426 A1* | 6/2013 | Beliveau | H04L 67/327 370/235 |

(Continued)

*Primary Examiner* — Kwang B Yao
*Assistant Examiner* — Syed M Bokhari
(74) *Attorney, Agent, or Firm* — Michael A. Davis, Jr.; Charles A. Brill; Frank D. Cimino

(57) ABSTRACT

An embodiment includes a plurality of tables in a hardware network for performing packet processing. Each table in the plurality of tables includes a table declaration. The table declaration includes a first set of fields used for input matching and a second set of fields used as inputs for action processing. A first table is selected from the plurality of tables. Successor tables to the first table are selected from the plurality of tables. There is a third set of fields for each successor table of the successor tables. The contents of the third set of fields are output fields where the output fields are modified by the first table when a next table of the first table is the successor table of the first table.

1 Claim, 2 Drawing Sheets

(56) References Cited

U.S. PATENT DOCUMENTS

2014/0146674 A1  5/2014  Wang et al.

\* cited by examiner

MATCH DEPENDENCY

ACTION DEPENDENCY

NO DEPENDENCY OR SUCCESSOR DEPENDENCY

PACKET PROCESSING MATCH AND ACTION PIPELINE STRUCTURE WITH DEPENDENCY CALCULATION REMOVING FALSE DEPENDENCIES

CROSS-REFERENCE TO RELATED APPLICATIONS

This application is a continuation of U.S. patent application Ser. No. 14/168,202 filed Jan. 30, 2014, which claims priority to U.S. Provisional Patent Application No. 61/919,362, filed Dec. 20, 2013 and to U.S. Provisional Patent Application No. 61/759,692 filed Feb. 1, 2013, which are incorporated herein by reference in their entireties.

BACKGROUND

Openflow is a networking communications protocol which separates the control and data planes of packet processing, enabling simpler and more efficient high speed data plane processing, and allowing the control processing of entire networks to be centralized under the control of a single software program. It is one of the enablers of Software Defined Networking. It is a stated goal of Software Defined Networking (SDN) to increase the flexibility and programmability of networks allowing users to more easily tailor networks to their needs.

Briefly, Openflow (OF) defines an Openflow switch to contain a series of associative flow tables. Each entry in a table contains ternary values (0,1, or dont-care for each bit) for a desired selection of packet fields, such as MAC source and destination addresses, IP source and destination addresses, TCP port numbers, etc. Openflow defines a number of standardized packet header fields for matching as well as allowing users to add their own custom fields. Table entries are in prioritized order, and for each individual packet processed by the Openflow switch, the table entries are searched in order for a matching entry. Note that table entries can have ternary values (don't-care for some or all bits) to match a broad selection of packets. When the first table match is found, a set of actions associated with that table entry is executed. These may modify fields of the packet, for example, by setting the MAC destination field to a new value, they may direct the Openflow switch to output the packet to a particular switch port in a particular queue, or send it to the Openflow software controller, or drop the packet. It is generally intended that when the existing flow tables don't know how to handle a packet, it is sent to the controller, which may respond by installing rules on the switch to properly process similar packets. This accomplishes the goal of control and data plane separation by having the Openflow controller software make the decisions concerning what flow tables to install, whereas the switch simply follows the directives of the controller instead of making complex behavioral decisions on its own.

In general, Openflow is defined to be able to flexibly match against packets, and directed by the matches, perform a comprehensive set of actions to modify the packet and decide what to do with it. This is done with a number of tables which operate on the packet sequentially.

When a packet enters a network switching device, it may be considered to be in one of two categories, depending on the number of destinations it is sent to by the device. Unicast packets are sent out one port to a single destination, whereas multicast packets are sent to multiple destinations. These multiple destinations may each get differently modified copies of the packet, and may be sent out different output ports. The process of sending multicast packets to multiple destinations, potentially each with a separately modified copy of the packet, is known in the industry as multicasting.

Another feature of Openflow is Openflow groups. There are several group types, but the ALL group is one of interest. The actions taken as a result of a match can include a group. A group is a container containing a number of buckets, where each bucket in turn is a set of actions. This set of actions is similar to the actions executed by any table match, so this in general defines a recursive capability, where instead of doing just a single set of actions, there are multiple sets of actions. Groups can even be contained within groups by being in the actions of any group bucket. In the ALL group, each bucket is executed on a separately created copy of the packet. Each action in that bucket is executed on that bucket's copy of the packet. It is typically then output to a particular switch port into a specific queue, as directed by its actions. Each bucket may output to a different switch port. The end result of an ALL group is to produce a number of copies of a packet, each separately modified, and each potentially sent to a different destination port and queue.

Openflow ALL groups implement multicasting; the sending of a packet from one input port source to multiple output port destinations. Multicasting is a common and important function of switches. Multiple buckets may also send their own copies of the packet to the same output port; there is no requirement that each copy go do a different output port. So in general, as a result of ALL group processing, the packet may send multiple separately modified copies of the packet to each of several output ports.

Another group type, fast failover, chooses the first bucket of the group which is associated with a live port. If a switch has the capability to detect when links to its neighbors are inoperative, and respond by marking them as not live, then failover groups immediately respond by sending packets to an alternative destination. This improves the responsiveness of OF switches to the hardware failures which inevitably occur in large systems.

There are other OF group types. The select group chooses one of the several buckets to execute (instead of all of them in an ALL group). The choice of which bucket is outside of the definition of OF, but it is commonly done as a pseudo-random choice made by hashing on different packet header fields. So packets with different headers will randomly go to different destinations, while packets with identical headers will always go to the same destination together. In the example of a switch processing multiple video streams, each of which is its own flow with a specific set of values for its header fields, different flows would be pseudo-randomly routed to different destinations, while all members of any flow would always go to the same destination. This feature is used to implement Equal Cost Multipath (ECMP), which gangs together several paths to achieve higher total bandwidth, with packets from different flows randomly assigned to each path to distribute the workload among the paths. It is desired that packets from the same flow be routed to the same destination, so that at the final destination packets arrive in order.

DETAILED DESCRIPTION OF EXAMPLE EMBODIMENTS

An embodiment includes a plurality of tables in a hardware network for performing packet processing. Each table in the plurality of tables includes a table declaration. The table declaration includes a first set of fields used for input matching and a second set of fields used as inputs for action processing. A first table is selected from the plurality of tables. Successor tables to the first table are selected from the plurality of tables. There is a third set of fields for each successor table of the successor tables. The contents of the third set of fields are output fields where the output fields are modified by the first table when a next table of the first table is the successor table of the first table.

OpenFlow processing of ethernet packets centers on a pipeline of match and action stages. An ethernet packet is parsed, and data from its header fields are presented to the first match and action stage. That stage will choose a subset of packet header fields, perform an associative match in a flow table, and as a result of the match, be directed to perform actions which may modify the packet header fields. Execution proceeds with the packet information flowing through a succession of match and action stages, each of which may choose different fields to match against and modify a different selection of fields. One action as a result of a match is to indicate the next table to be executed. If that successor table is not the next table after the one executing, the intervening tables are skipped.

A hardware architecture for performing packet processing using the OpenFlow paradigm is described in U.S. patent application Ser. No. 14/072,989 "An Openflow Match and Action Pipeline."

Much like dependencies exist between instructions in a computer, dependencies exist between successive match tables. There are three types of dependencies, match dependencies, action dependencies and successor dependencies, each described below.

Figure 1A:
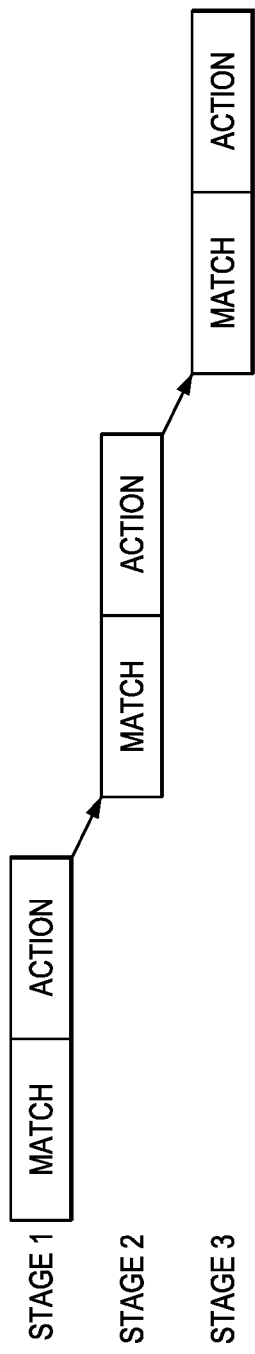
FIG. 1a is a timing diagram showing the timing of sending a packet through three stages when there are match dependencies between the stages according to embodiments.

Processing in an individual match stage occurs over a number of clock cycles. Matching occurs, then as a result of a match, actions are taken, with each of those operations requiring several clock cycles. Then finally, the modified packet header vector is output. Match dependencies occur when a match stage modifies a packet header field and a subsequent stage matches upon that field. In that case, the first stage must completely finish both match and action processing before the subsequent stage can begin execution. No overlapping in time of the processing of the two match stages is possible, as shown in FIG. 1a. FIG. 1a also shows a small time gap between the end of first stage execution and the beginning of the second stage execution. This is a transport delay, the time it takes to physically move signals from the output of the first stage to the input of the second stage on chip.

Figure 1B:
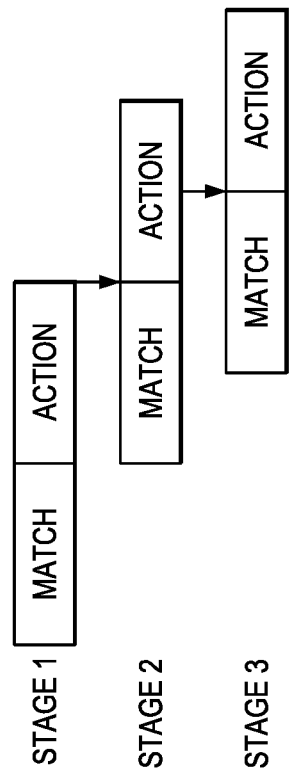
FIG. 1b is a timing diagram showing the timing of sending a packet through three stages when there are action dependencies between the stages according to embodiments.

Action dependencies occur when a match stage modifies a packet header field and a subsequent stage uses that field as an input to an action. This differs from the match dependency above in that the modified field is an input to the action processing rather than the earlier match processing. For example, if one stage sets a TTL field and the next stage decrements TTL, then the result of the first stage is required before executing the action of the second. In this case, partial overlapping of the two match stages' executions is possible, as shown in FIG. 1b. The second stage can execute its match, but before its action begins it must have the results from the previous stage. Here, the second stage action begins one transport delay after the first stage execution ends.

Figure 1C:
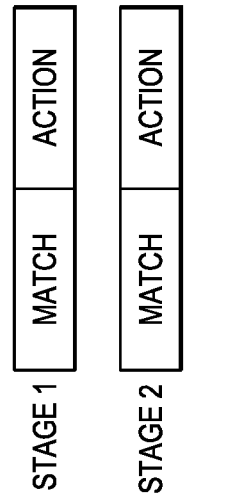
FIG. 1c is a timing diagram showing the timing of sending a packet through three stages when there are no dependencies between the stages or successive dependencies according to embodiments.

If no dependencies exist between match stages, their execution can be concurrent. FIG. 1c shows this case, where the executions of consecutive stages are offset only by the transport delay. No results of a stage are available to input to either match or action processing of a subsequent stage.

A third type of dependency, a successor dependency, occurs when the execution of a match stage is predicated on the result of execution of a prior stage. Each flow match in a table must indicate the next table to be executed, including the default action on a table miss where no flows matched. Absence of a next table indicates the end of table processing. If A, B and C are three successive tables, A's execution may specify B as the next table, or alternatively, C or a later table. Only in the first case is table B executed, so B's execution is predicated on the successor indication from A. In this case, the switch runs table B speculatively, and resolves all predication qualifications before any results from B are committed. Predication is resolved inline not only within the 16 tables of a match stage, but also between stages using the inter-stage transport delay. So the pipeline schedule of FIG. 1c also applies when successor dependencies occur. Whereas in this design successor dependencies incur no additional delay, this delay is implementation dependent, and could be as much as a match dependency if no speculative table execution is done.

The pipeline delays between successive stages are statically configurable between the three options of FIGS. 1a, 1b and 1c individually for the ingress and egress threads. Pipeline delays are derived by analyzing a table typing flows.

While it is possible to change the switch's pipeline configuration while processing, generally the pipeline is meant to be static. Dependencies between stages for each packet are not analyzed dynamically in the way that dependencies between instructions are dynamically analyzed by a CPU pipeline.

The table typing information described in advance includes which fields are input for matching, which fields are modified by the table, and all possible successor tables. Additional information is required not in advance, declaring which fields are used as inputs by the action processing of the table. With that information it is possible to derive the local (and from that the global) action dependencies between tables, so it can be determined which tables can be arranged in the same stage and which tables need the latencies between them required by action dependencies. The inclusion in table declarations of which fields are used as inputs by the action processing of the table is necessary in order to determine whether action dependencies exist. In order to execute tables concurrently, it must be proven that no action dependencies exist between them, so in the absence of this information, no concurrent execution is possible.

Figure 2B:
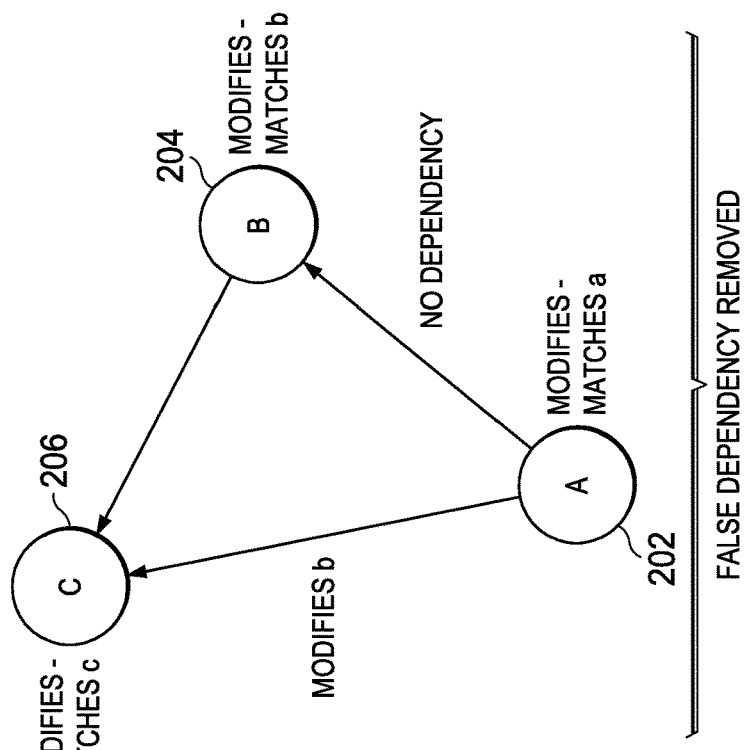
FIG. 2b is table-typing flow chart, in block form, illustrating a false dependency removed according to an embodiment.
Figure 2A:
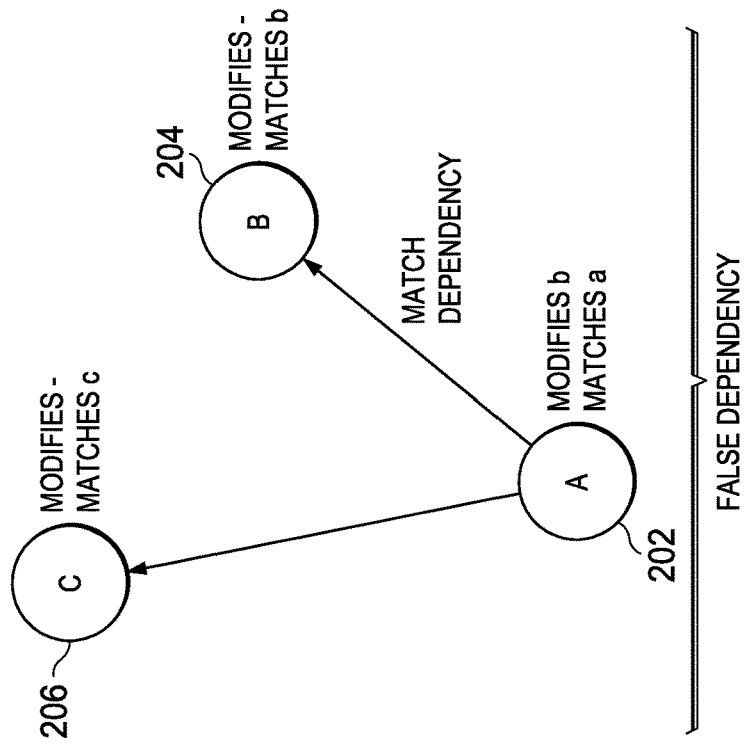
FIG. 2a is table-typing flow chart, in block form, illustrating a false dependency according to an embodiment.

An embodiment provides additional information in table declarations and uses that information to remove false dependencies. For each table, the modified output fields are declared separately for each possible table destination, which removes some false dependencies where a successor table would otherwise show a dependency to data modified only when that successor is not executed. For example, consider three tables executing in succession, tables A 202, B 204 and C 206, which match against packet fields a, b and c, respectively, as shown in FIG. 2*a*. Table A 202 may specify either B 204 or C 206 as its successor, so sometimes table B 204 is skipped. If table A 202 modifies field b, which table B 204 matches against, there is a match dependency between tables A 202 and B 204, so B 204 cannot be run concurrently with A 202, and must instead use the pipeline arrangement of FIG. 1*a*. Table C 206 can run concurrently with B 204, since there are no match or action dependencies between them. Suppose an examination of Table A's 202 flow entries shows that not all entries modify field b as their action. Specifically, none of A's 202 table entries which specify B 304 as the successor table modify field b, only entries which skip B 204 and specify C 206 as the successor modify this field b. As a result, the previous analysis which indicated a match dependency from A 202 to B 204 is pessimistic. It has found and removed a false dependency, as shown in FIG. 2*b*.

In this embodiment, the table declaration for Table A 202, like all tables, specifies which packet header fields are modified as actions, listed separately for each possible table successor. As with other table declarations, this information is preferably described in advance, or less preferably by examining all flow table entries. In that case, Table A 202 would show that with B 204 as a successor, no fields are modified, while for Table C 206 as a successor, field b is modified. This would introduce no match dependency to B 204, since when B 204 is executed, field b has not been modified by table A, and would introduce no match dependency to table C 206 because table C 206 does not match on the modified field b.

By including this additional information, the system which arranges the table topology can eliminate the false match dependency, and as a result find greater opportunity to arrange tables concurrently, which both improves memory utilization in the match stages and reduces latency.

The same per-successor listing of modified output fields can be used to filter action dependencies to a successor stage. An action dependency occurs when a successor table uses a field as an action input which the prior table has modified. With the per-successor listing of modified output fields, fields which are only modified when the successor table is not executed can be eliminated from consideration when calculating action dependencies.

Non-local dependencies can be calculated with the same improved performance achieved by removing false dependencies. The notion of which fields are modified by an input table to a successor table must include both the immediately preceding table and previous tables. The list of fields modified by prior tables must include all earlier per-successor sub-lists where execution of that earlier successor can lead to execution of the successor whose dependencies are being calculated.

Calculating action dependencies, local and nonlocal, is just like calculating match dependencies, except the set of fields compared against a predecessor table's modified output fields is the successor table's list of fields input for actions rather than the table's list of fields input for matching.

Modifications are possible in the described embodiments, and other embodiments are possible, within the scope of the claims.

What is claimed is:

1. A method performed by hardware, the method comprising:

from at least first, second and third tables stored in a memory, select the first table, the tables having respective declarations, including a first declaration for the first table, the first declaration specifying:
an input field of the first table;
an output field of the first table;
the second and third tables as possible successors to the first table;
whether a first dependency exists between the output field and the second table as successor to the first table; and
whether a second dependency exists between the output field and the third table as successor to the first table;
choose a first subset of packet header fields from a packet;
perform a first associative match between the first table and the first subset;
responsive to the first associative match, modify a first portion of the packet header fields;
select one of the second or third tables as successor to the first table responsive to whether the first dependency exists or whether the second dependency exists;
choose a second subset of the packet header fields, the second subset being different from the first subset;
perform a second associative match between the successor table and the second subset; and
responsive to the second associative match, modify a second portion of the packet header fields, the second portion being different from the first portion.

\* \* \* \* \*